Figure 1:
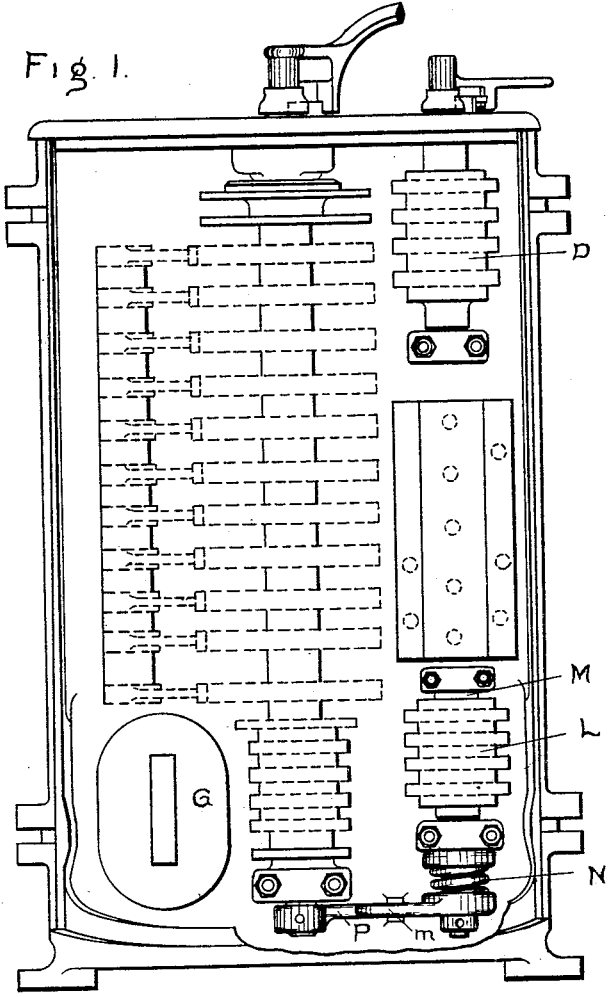

No. 733,271. PATENTED JULY 7, 1903.
W. B. POTTER.
ELECTRIC BRAKE.
APPLICATION FILED JAN. 30, 1901.
NO MODEL. 3 SHEETS—SHEET 1.

Witnesses:
Robt C. Chapman
Benjamin B. Hull

Inventor.
William B. Potter
by Albert G. Davis
Atty.

No. 733,271.  
PATENTED JULY 7, 1903.

W. B. POTTER.  
ELECTRIC BRAKE.  
APPLICATION FILED JAN. 30, 1901.

NO MODEL.  
3 SHEETS—SHEET 2.

Witnesses:  
Inventor  
William B Potter  
by Albert G. Davis  
Atty

No. 733,271. PATENTED JULY 7, 1903.
W. B. POTTER.
ELECTRIC BRAKE.
APPLICATION FILED JAN. 30, 1901.
NO MODEL. 3 SHEETS—SHEET 3.

Witnesses:
Robt. C. Chapman
Benjamin B. Hull

Inventor.
William B. Potter.
by Albert G. Davis
Atty.

No. 733,271. Patented July 7, 1903.

UNITED STATES PATENT OFFICE.

WILLIAM B. POTTER, OF SCHENECTADY, NEW YORK, ASSIGNOR TO GENERAL ELECTRIC COMPANY, A CORPORATION OF NEW YORK.

ELECTRIC BRAKE.

SPECIFICATION forming part of Letters Patent No. 733,271, dated July 7, 1903.

Application filed January 30, 1901. Serial No. 45,292. (No model.)

*To all whom it may concern:*

Be it known that I, WILLIAM B. POTTER, a citizen of the United States, residing at Schenectady, county of Schenectady, State of New York, have invented certain new and useful Improvements in Electric Brakes, of which the following is a specification.

This invention relates to electric brakes, and especially those in which current from an auxiliary source is utilized to hold the brakes set after the braking-current from the motor or motors acting as a generator has practically ceased owing to the stopping of the car. If the car has stopped on a grade, the cessation of the braking-current will render the brakes inoperative and without some such device as the one I have invented the car will presently start down the grade by gravity, owing to the dying out of the magnetism in the brake-shoe. To remedy this inconvenience, the brake system is provided with an auxiliary source of current and means whereby as soon as the car slows down and the braking-current practically ceases the auxiliary current can be sent through the braking-circuit in the same direction as the motor-generated current, thus maintaining the magnetism of the brake-shoes and keeping the brakes set. If there is no likelihood that the car would start itself when the motor-generated braking-current ceases, it will, of course, be unnecessary to make use of the auxiliary source of braking-power.

Heretofore it has been proposed to use the line-current as the auxiliary source of power or to use a storage battery with means for automatically connecting it with the brake-magnet when the motor-generated braking-current dies down below a predetermined voltage. Both of these modes of operation are objectionable in practice, since the trolley-current may fail at a critical moment or the automatic connecting devices may not operate at the right instant to hold the car.

I make use of a battery on the car, preferably a storage battery, but I provide a switch auxiliary to the main controller and under the control of the motorman, so that the auxiliary holding device can be used or not at the will of the motorman and can be thrown into action instantly whenever it may be necessary.

The storage battery is preferably arranged to be charged by the motor-generated current, which is usually in excess of that needed to energize the brake-magnet. This is conveniently provided for by suitable contacts and fingers on the main controller. The auxiliary switch is constructed to reverse the connections of the storage battery when it is used to supply braking-current in order that the battery may discharge through the brake-magnet in the same direction as the motor-generated current previously flowed.

My invention therefore consists in an electric braking system provided with a storage battery and an auxiliary switch, whereby the motorman can make use of said battery to energize the brake-magnet. I prefer to actuate the auxiliary switch by means of the main car-controller and to so arrange it that it will preferably be operated by a final movement of the controller-handle beyond the positions controlling the motor-generated braking-current.

Figure 2:
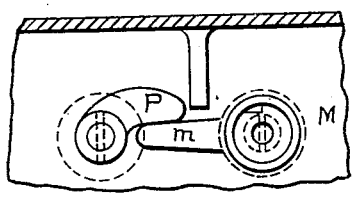
Figure 3:
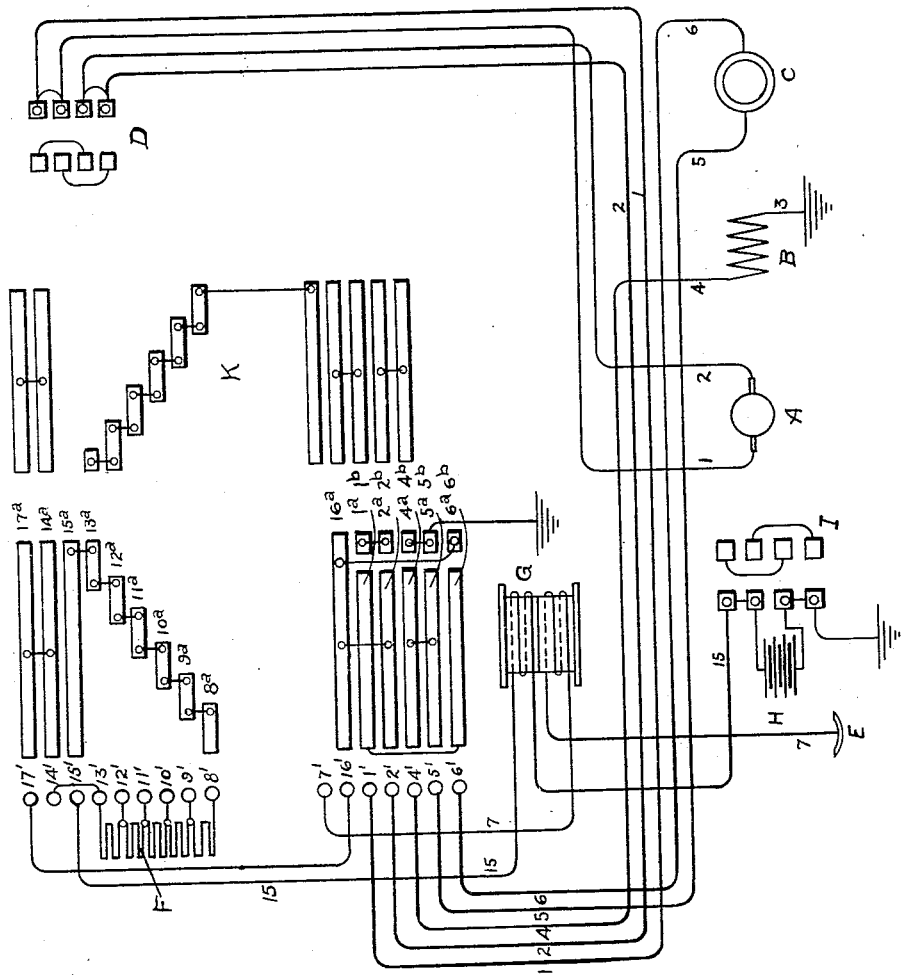
Figure 4:
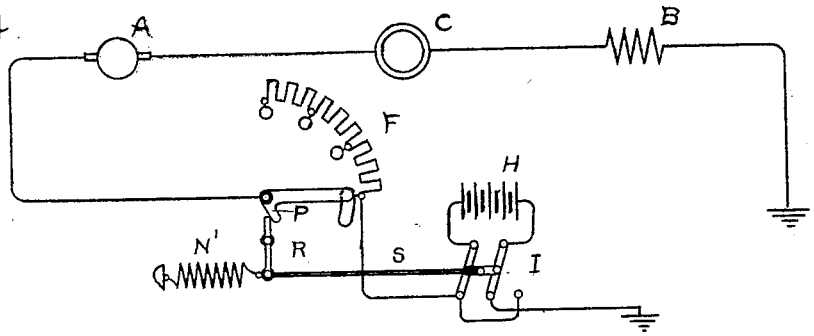
Figure 5:
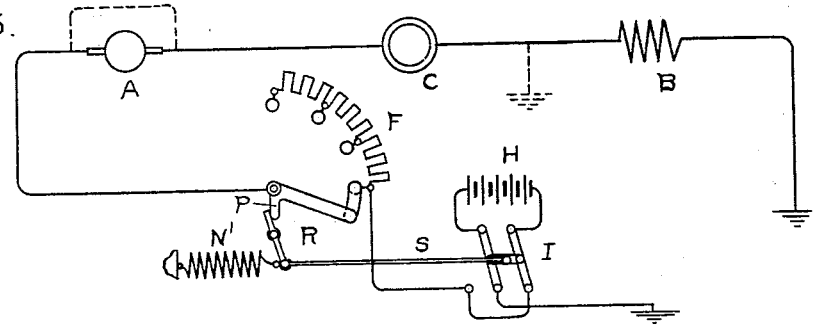
Figure 6:
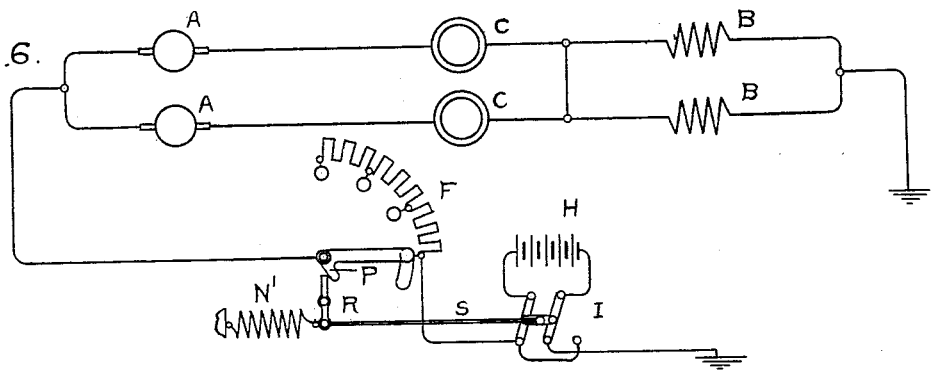
Figure 7:
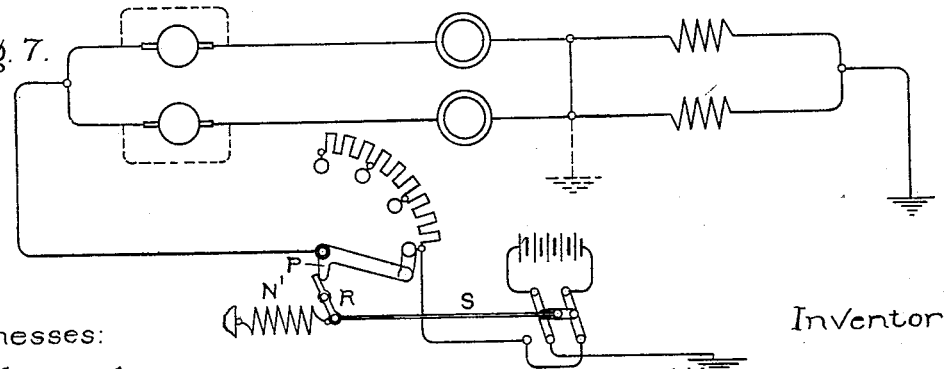

In the accompanying drawings, Figure 1 is a front elevation of a controller and an auxiliary switch embodying my improvements. Fig. 2 is a plan view of a portion of the mechanism thereof. Fig. 3 is a diagram of the circuits. Fig. 4 is a diagram of the connections of a single motor when acting as a braking-generator and charging the storage battery. Fig. 5 shows the same when the battery is energizing the brake-shoes. Figs. 6 and 7 show the same relative connections for a pair of motors.

Referring to the diagram Fig. 3, let A represent the armature of a single motor; B, the field-coil thereof; C, the brake-magnet; D, the motor-reversing switch; E, the trolley; F, the rheostat; G, the blow-out magnet; H, an auxiliary source of current, and I the auxiliary switch for controlling said auxiliary current. The armature-leads are numbered 1 2, and they are connected with the fingers 1' 2'. One field-coil lead, 3, is grounded, and the other, 4, is connected with the finger 4'.

The brake-magnet leads 5 6 are connected with the fingers 5' 6'. The trolley-lead 7 includes a portion of the coils on the blow-out magnet and terminates in the finger 7'. The several sections of the rheostat are connected with the fingers 8' 9' 10' 11' 12' 13' 14'. The auxiliary source of current connects by leads 15 through the auxiliary switch I, and the remaining coils of the blow-out magnet with the finger 15'. There are also two fingers 16' and 17' looped together.

The controller-cylinder carries a set of contact-segments K for making the power connections of the motor. These are the same as usual and need not be described in detail. There is also a set of braking-segments, as follows: $14^a$, $15^a$, $16^a$, and $17^a$, extending over seven positions of the controller-cylinder; $1^a$, $2^a$, $4^a$, $5^a$, and $6^a$, extending over six positions and having an insulated segment $1^b$, $2^b$, $4^b$, $5^b$, and $6^b$ in the seventh position, $8^a$ covering the first and second positions, $9^a$ covering the second and third, $10^a$ the third and fourth, $11^a$ the fourth and fifth, $12^a$ the fifth and sixth, and $13^a$ the sixth and seventh. For convenience I have shown seven braking positions, but it will be understood that any other desired number may be used. Segments $1^a$ and $6^a$ are looped together and so also are segments $2^a$ and $16^a$, $16^a$ and $6^b$, $4^a$ and $5^a$, $1^b$ and $2^b$, $4^b$ and $5^b$, $8^a$ $9^a$ $10^a$ $11^a$ $12^a$ $13^a$ and $15^a$, and $14^a$ and $17^a$. Segments $4^b$ and $5^b$ are grounded.

In any of the first six positions of the braking-segments the circuit will be as follows: from one terminal of the armature A through the reversing-switch D, finger 1', segments $1^a$ $6^a$, finger 6', lead 6, brake-magnet C, lead 5, finger 5', segments $5^a$ $4^a$, finger 4', lead 4, and field-coil B to ground. From the other terminal of the armature A the circuit runs through the reversing-switch D to finger 2', segments $2^a$ $16^a$, fingers 16' 17', segments $17^a$ $14^a$, fingers 14' 13', through the sections of the rheostat F corresponding with the given position of the controller, and the corresponding finger and segment to segment $15^a$, finger 15', lead 15, blow-out magnet G, and storage battery H to ground. This circuit is diagrammed in Fig. 4, and the storage battery will be charged when connected up in this way.

In the seventh position of the controller the field-coils B are grounded through segments $4^b$ and $5^b$. The armature A is short-circuited by the connected segments $1^b$ $2^b$. The brake-magnet C is grounded at one terminal through the segment $5^b$. The other terminal is connected through segments $6^b$, $16^a$, fingers 16' and 17', segments $17^a$ and $14^a$, fingers 14' and 13', segments $13^a$ and $15^a$, finger 15', and lead 15 with the storage battery or other auxiliary source of current to ground. If a storage battery is used, the switch I must be a reversing-switch, arranged to be reversed simultaneously with the movement of the controller to the seventh position, so as to discharge the battery-current in the proper direction through the brake-magnet. This arrangement of the circuit is shown in Fig. 5.

The controller shown in Figs. 1 and 2 is adapted to make the above-described changes in the circuits. The auxiliary switch I for controlling the auxiliary source of current is located in the lower part of the casing, being a drum L, carrying suitable contacts engaging with stationary fingers and rotatable on a vertical shaft M, which has a helical or other spring N connected with it. An arm $m$ is secured to the shaft, lying in the path of a tappet P on the shaft of the controller-cylinder. When the cylinder is in the sixth braking position, the tappet comes in contact with the arm $m$, so that when the cylinder is turned to the seventh position the tappet will move the arm and throw the auxiliary switch I. Upon the reverse movement of the cylinder the spring N returns the auxiliary switch to its normal position.

In Figs. 4 to 7, inclusive, the tappet on the main shaft of the controller actuates a lever R, connected by a link S with the switch and retracted by a spring N'.

It will be readily understood that the specific construction of the switch I and the arrangement of its contacts will be modified to meet the requirements of service, depending on the nature of the auxiliary source of braking-current.

What I claim as new, and desire to secure by Letters Patent of the United States, is—

1. In a braking system for electrically-operated vehicles, the combination with a motor, a brake-magnet and a storage battery, of a controller provided with a main switch having contacts constructed and arranged to connect said motor as a momentum-driven generator in a closed circuit and to vary the resistance of said circuit, and an auxiliary switch arranged to be operated by the main switch in its final braking position to connect the storage battery in circuit with the brake-magnet.

2. In a braking system for electrically-operated vehicles, the combination with a motor, a brake-magnet and a storage battery, of a controller provided with a main switch having its contacts constructed and arranged to connect said motor as a momentum-driven generator in circuit with said brake-magnet and to vary the resistance of said circuit, and an auxiliary switch operatively connected to said main switch for connecting the storage battery in circuit with the brake-magnet.

3. In a braking system for electrically-operated vehicles, the combination with a motor, a brake-magnet and a storage battery, of a controller provided with a main switch having its contacts constructed and arranged to connect said motor so that it will operate as a momentum-driven generator, and an auxiliary switch operatively connected to the main switch and having its contacts arranged to connect the storage battery in circuit with the brake-magnet.

4. In a braking system for electrically-operated vehicles, the combination with a motor, of a brake-magnet, a battery on the vehicle, a controller, an independently-operative switch for connecting the brake-magnet with the battery, and connections whereby said switch will be actuated when the controller is turned to a position beyond the last braking position.

5. In an electric braking system, the combination with a motor, of a main controlling-switch, an auxiliary switch, means for actuating said auxiliary switch when the main controlling-switch is turned beyond the last braking position, and a spring for returning said auxiliary switch to its normal position.

6. In an electric braking system, the combination with a motor-controller, of a rotary auxiliary switch, an arm to rotate said switch, and a tappet on the main shaft of the motor-controller for actuating said arm when the controller is turned beyond the last braking position.

7. In an electric braking-controller, a rotary auxiliary switch, an arm on the shaft of said switch, a tappet on the main shaft of the controller to actuate said arm when the controller is turned beyond the last position, and a spring connected with said switch to return it to its normal position.

8. In an electric braking system, in combination, a motor, an electrically-actuated brake, a controlling-switch for connecting said motor to operate as a momentum-driven generator supplying current to actuate said brake, and an auxiliary switch arranged to be operated by said controlling-switch in its last operative position, the said switch having its contacts arranged to connect the storage battery to the electrically-actuated brake.

9. In an electric braking system, in combination, a motor, an electrically-actuated brake, a controlling-switch provided with contacts for connecting said motor to operate as a momentum-driven generator in a circuit including said brake, and contacts arranged to be operated in the last position of the controlling-switch for connecting a storage battery in said circuit and short-circuiting the windings of the motor.

In witness whereof I have hereunto set my hand this 28th day of January, 1901.

WILLIAM B. POTTER.

Witnesses:
BENJAMIN B. HULL,
MARGARET E. WOOLLEY.